3,457,273
DERIVATIVE OF PHENYLBUTAZONE
Paul Rumpf, Jean-Eugene Thuillier, and Germaine
Thuillier, nee Nachmias, Paris, France, assignors
to Centre National de la Recherche Scientifique,
Arcueil, France, a French body corporate
No Drawing. Filed Aug. 26, 1966, Ser. No. 575,248
Claims priority, application France, Sept. 8, 1965,
30,820
Int. Cl. C07d 49/04, 49/18; A61k 27/00
U.S. Cl. 260—311                                   3 Claims

ABSTRACT OF THE DISCLOSURE

A compound of the formula

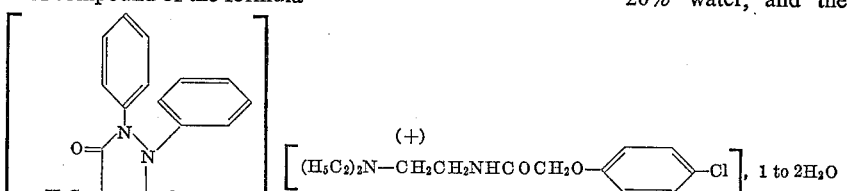

This compound is useful as an anti-inflammatory agent.

This invention relates to a new derivative of phenylbutazone.

Phenylbutazone, or 4-n-butyl 3,5-dioxo 1,2-diphenyl pyrazolidine which has the Formula I:

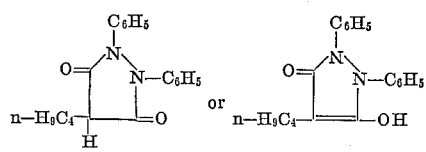

and clofexamide, or p-chloro phenoxy acetic acid β-diethylamino ethylamide which has the Formula II:

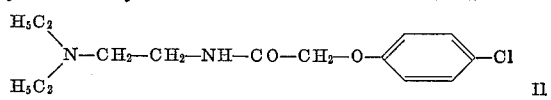

are known for therapeutic purposes.

It has been found that it is possible to prepare from these two compounds a product which is the result of their addition in equimolecular proportion and which occurs in the crystalline state with water of crystallisation, either at a level of one mol—when it is prepared in aqueous acetone, or immediately at a rate of two mols, when it is prepared, for instance, in dimethyl formamide, the one-mol product gradually hydrating, with no change in melting point, into the dihydrated form which is, apparently, the stable form.

This product has the general formula which follows and according therefore to a first feature of the present invention there is provided as a new chemical compound, a compound of the Formula III:

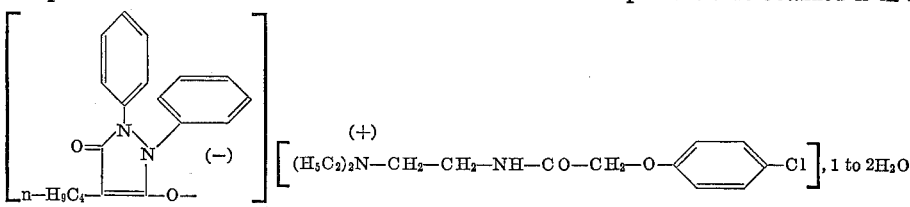

According further to this invention, there is provided a process for the production of a composition of Formula III which comprises reacting clofexamide, in a diluent or mixture of diluents, with phenylbutazone.

The diluents used, may be, for example, ethyl alcohol, ethyl acetate, aqueous dioxane, aqueous ethanol, aqueous acetone or aqueous methyl ethyl ketone, or dimethyl formamide or methylene chloride. In a variant of the process clofexamide hydrochloride may be reacted with phenylbutazone in water. The phenylbutazone and clofexamide are preferably used in substantially equimolecular proportions.

The following examples will serve to illustrate the production of the compounds of the invention:

EXAMPLE 1

935 g. of phenylbutazone are dissolved, with heating to a lukewarm state, in 2.7 litres of acetone containing 20% water, and the mixture is filtered if necessary.

853.5 g. of p-chloro phenoxy acetic acid diethylamino ethylamide are dissolved in 300 cc. of acetone containing 20% water, and the solution is poured into the phenylbutazone solution. There is slight heating, and the solution clarifies. The salt crystallises rapidly. Drying is effected on a Buchner funnel and the mixture is washed in 450 cc. of acetone containing 20% of water. The 1702 g. of product obtained is recrystallised in 2450 cc. of acetone containing 20% of water and, after drying in an oven at 37° C., 1585 g. (86%) of product are obtained. The product is in the form of a white crystalline powder having a melting point of from 87 to 89° C. in the Maquenne block. The product is insoluble in water and ether and benzene, relatively soluble in dioxane and in chloroform (the water of crystallisation separates out) and soluble in acetone and alcohols. In solution in a $2.10^{-5}$ concentration in 95% ethyl alcohol it gives in ultra-violet light a spectrum having maxima at 227 and 270 m$\mu$.

Karl Fischer reagent test show that even when the product was isolated in its monohydrated form when it was prepared, as hereinbefore described, in the (4:1) acetone-water mixture, it gradually hydrated in time into the dihydrated form which is, apparently, the stable form of the product.

EXAMPLE 2

853.5 g. of p-chloro phenoxy acetic acid diethylamino ethylamide are dissolved in 1 litre of dimethyl formamide and a solution of 925.5 g. of phenylbutazone in 1 litre of the same solvent is added, whereafter the mixture is diluted with 10 litres of water. The mixture is filtered to isolate the crystallised product which is obtained in this way with a 93% yield. After recrystallisation in acetone containing 20% of water, the final yield is 79%. The product thus obtained is in its dihydrated form.

EXAMPLE 3

A solution of 284.5 g. of p-chloro phenoxy acetic acid N-diethylamino ethylamide in 1 litre of methylene chloride is mixed with a solution of 308.3 g. of phenylbutazone in 500 cc. of the same solvent. The solvent is distilled and the oily residue taken up by acetone having 20% water contents, the product crystallising. The yield is around 85%.

EXAMPLE 4

616 g. of phenylbutazone are suspended in 2 litres of aqueous methyl ethyl ketone. A solution of 568 g. of p-chloro phenoxy acetic acid diethylamino ethylamide in 1 litre of the same solvent is prepared and mixed. The heat evolved in the reaction causes all the phenylbutazone to be dissolved. The crystallised product is obtained in a 90% yield by cooling.

EXAMPLE 5

A suspension of 308.3 g. of phenylbutazone in 1.5 litre of 50% ethyl alcohol has poured into it a lukewarm solution of 284.5 g. of p-chloro phenoxy acetic acid diethylamino ethylamide in 1 litre of the same solvent. The crystallised product is isolated from the resulting solution after cooling, with an 86% yield.

EXAMPLE 6

6.42 g. of p-chloro phenoxy acetic acid diethylamino ethylamide hydrochloride in solution in 35 cc. of water are mixed with 6.16 g. of phenylbutazone in solution in 20 cc. of standard caustic soda and 35 cc. of water. The salt precipitates and gradually crystallises. 11.6 of product are obtained.

The novel salt has been tested pharmacologically, with the following results.

(1) Toxicological study

Toxicological studies were made consecutively in mice and in Wistar stock rats. All the animals were distributed into uniform batches weightwise and sexwise. The water-insoluble product was administered via the digestive tract in the form of a fine suspension in a dilute solution of Tween 80. The animals were observed for 48 hours and the lethal$_{50}$ dose was calculated by the method of Litchfield and Wilcoxon.

(a) Acute toxicity in mice.—When administered per os the new salt has a $LD_{50}$ of 2000 mg./kg. The slope of the regression line is S=1.25 and the confidence interval for P=0.05 is between 1754 and 2280 mg./kg. for $LD_{50}$ and between 1 and 1.6 for the regression line. By way of comparison, the $LD_{50}$ as calculated by the same method was 540 mg./kg. for phenylbutazone. The slope of the regression line is S=1.40. The confidence interval for P=0.05 is between 457 and 657 mg./kg. for $LD_{50}$ and between 1.09 and 1.79 for the regression line.

(b) Acute toxicity in rats.—The overall results led to a $LD_{50}$ of 3.550 mg./kg. The slope of the regression line is S=1.09. The confidence interval is between 3386 and 3727 mg./kg. for $LD_{50}$ and near unity for the regression line. The $LD_{50}$ of phenylbutazone was 1000 mg./kg.

Consequently, the new salt administered per os is not highly toxic; indeed, it is considerably less toxic than phenylbutazone.

The following table sums up this toxicological study.

| | Mice, $LD_{50}$ in mg./kg. P.O. | Rats, $LD_{50}$ in mg./kg. P.O. |
|---|---|---|
| New salt | 2,000 | 3,550 |
| Phenylbutazone | 540 | 1,000 |

(2) Investigation of antivisceralgic and analgesic properties

For this investigation, three tests were made on mice.

(a) Koster's acetic acid test.—Injections of acetic acid cause painful manifestations in animals, such as twisting and stretching of the trunk. The reduction in the number of these reactions after administration of the product is in direct relationship to the antivisceralgic property of the product.

(b) Eddy's hot-plate test.—The pain reaction is produced by heat stimulation applied at the level of the plantar surface of the animals. The reaction time, which increases after administration of the product, determines the analgesic power thereof.

(c) Heat stimulation test of tail (Amour and Smith).—A hot beam is concentrated on the animal's tail. The burning sensation appears after a time depending upon the analgesic value of the product.

The animals were given the three tests consecutively. The following tables give the results obtained in relation to the results obtained with phenylbutazone, 1 hour and 5 hours after administration of the product.

(a) Acetic acid test.

| | Dose, mg./kg. (per os) | Percent inhibition of pain reactions | |
|---|---|---|---|
| | | 1 h. after | 5 h. after |
| New salt | 500 | 70 | 75 |
| Phenylbutazone | 250 | 23 | 54 |

(b) Hotplate test.

| | Dose, mg./kg. (per os) | Percent analgesic | |
|---|---|---|---|
| | | 1 h. after | 5 h. after |
| New salt | 500 | 42 | 19 |
| Phenylbutazone | 250 | 10 | 0 |

(c) Test of Amour and Smith.

| | Dose, mg./kg. (per os) | Percent analgesic | |
|---|---|---|---|
| | | 1 h. after | 5 h. after |
| New salt | 500 | 39 | 12 |
| Phenylbutazone | 250 | 6 | 15 |

The analgesic activity of the new salt, bearing in mind its phenylbutazone contents, is considerably better than the analgesic activity of phenylbutazone.

(3) Studies of antiphlogistic activity

These experiments were performed on mice and rats distributed into uniform batches. To determine anti-inflammatory activity, regression of the oedema produced at the level of the plantar surface of the rear paws by an injection of phlogogenic agent, kaolin or formaldehyde, was investigated.

(a) Kaolin test.—Regression of the oedema is determined by the difference between the weights of the paws when they are dissected after sacrifice of the animals.

The results obtained with the new salt and with phenylbutazone are given in the following tables:

MICE

| Substance | Dose in mg./kg. | | | |
|---|---|---|---|---|
| | 250 | 375 | 500 | 750 |
| New salt, percent | 8 | | 39 | 47 |
| | | | 39 | 47 |
| Phenylbutazone, percent | 35 | 33 | | |
| | 20 | | | |
| New salt, percent | 30 | 30 | | |

RAT

| Code | Dose, mg./kg. | Mortality, percent | Regression of oedema, percent |
|---|---|---|---|
| New salt | 500 | 0 | 61 |
| | 750 | 0 | 99 |
| Do | 500 | 0 | 98 |
| | 750 | 0 | 95 |
| Phenylbutazone | 250 | 20 | 4 |
| | 375 | 80 | 29 |
| Do | 250 | 0 | 63 |
| | 375 | 20 | 81 |

(b) formaldehyde oedema in mice.

| Code | Dose, mg./kg. per oz. | Mortality, percent | Regression of oedema, percent |
|---|---|---|---|
| New salt | 100 | 0 | 7 |
| | 250 | 0 | 27 |
| | 500 | 0 | 31 |
| Do | 500 | 0 | 42 |
| | 750 | 0 | 31 |
| Phenylbutazone | 50 | 0 | 0 |
| | 100 | 0 | 31 |
| | 250 | 0 | 12 |
| Do | 250 | 0 | 44 |
| | 375 | 20 | 71 |

The anti-inflammatory activity of the new salt as compared with the anti-inflammatory activity of phenylbutazone is distinguished by a greater regression of the kaolin oedema and by substantially equal activity on the formaldehyde oedema. In the light of the relationship between the toxicities of the two substances, the comparison clearly favours the new salt.

(4) Studies of activity on the gastric mucous membrane

Daily intramuscular injections of phenylbutazone for 6 consecutive days at a rate of 150 mg./kg. produced gastric ulcers in from 20 to 60% of the rats. Daily intramuscular injections of the new salt at a rate of 300 mg./kg. in the same conditions do not affect the wall of the stomach at all.

(5) Investigation of cardiovascular activity

Investigation in a first phase on an isolated rabbit's heart by Langendorf's method and in a second phase on a dog anaesthetised with chloralose gave the following results:

(a) In the case of the isolated heart, injection of the new salt in progressive doses of from 50γ to 500γ cause no disturbance on coronary vasomotricity nor on the myocardic fibre. Cardiac depression with a toxic dose (1 mg.) is only momentary.

(b) In the case of the anaesthetised dog, intraduodenal injection of the new salt at a rate of 6 tablets containing 0.20 g. of active substance caused no change in arterial pressure, respiration and renal volume. The various reagents of the neurovegetative system (adrenalin, noradrenalin, acetylcholine) underwent no reduction of their own tensional activity.

It can therefore definitely be stated, so far as the new salt is concerned, that:

(1) Its acute toxicity is less than for phenylbutazone;
(2) It has increased antivisceralgic and analgesic activity;
(3) It has an improved anti-inflammatory activity, and
(4) Unlike phenylbutazone, it has no harmful effect on the gastric mucous membrane.

The new salt can be used in human medicine as an anti-inflammatory agent, to which end it can be presented in association with some conventional excipient or vehicle; more particularly, it can be associated with an excipient for administration per os, for instance, for tablets, or it can be offered in gelule form. It can also be offered in suppository or pomade form for external use. The tablets can contain 200 mg. of the new salt and suppositories 400 mg. and the pomade can contain 5% by weight of the new salt.

The following are typical examples of pharmaceutical compositions:

(1)

|  | G. |
|---|---|
| Salt of phenylbutazone of diethylamino ethylamide or p-chloro phenoxy acetic acid | 0.40 |
| "Witepsol" excipient | 2.30 |
| For a suppository weighing | 2.70 |

(2)

| Salt as specified above | 0.20 |
|---|---|
| Lactose | 0.03 |
| Magnesium stearate | 0.002 |
| For a gelatine-coated pill containing | 0.232 |

From 200 to 1000 mg. per day has so far been found a satisfactory posology.

We claim as our invention:

1. A compound of the formula

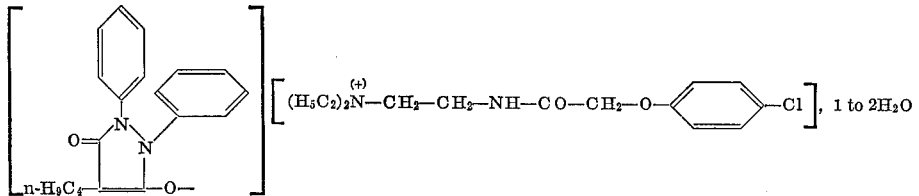

2. A compound of the formula

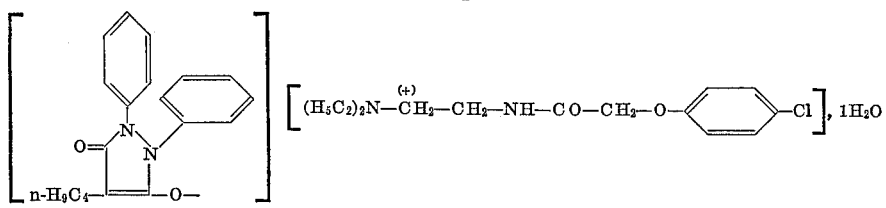

3. A compound of the formula

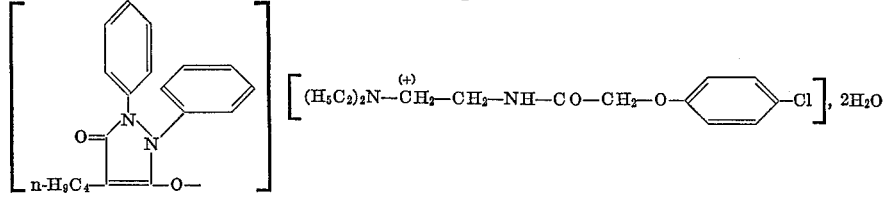

(References on following page)

References Cited

UNITED STATES PATENTS

| | | | |
|---|---|---|---|
| 569,415 | 10/1896 | Hinsberg | 260—311 |
| 1,068,083 | 7/1913 | Scheitlin et al. | 260—311 |
| 1,871,950 | 8/1932 | Callsen | 260—311 |
| 2,345,385 | 3/1944 | Dohrn et al. | 260—311 |
| 2,541,651 | 2/1951 | Hoffer | 260—311 |
| 2,562,830 | 7/1951 | Stenzl. | |
| 2,887,474 | 5/1959 | Alter et al. | 260—96.5 |
| 3,202,675 | 8/1965 | Albertson | 260—310 |

HENRY R. JILES, Primary Examiner

N. TROUSOF, Assistant Examiner

U.S. Cl. X.R.

260—310; 424—273

UNITED STATES PATENT OFFICE
CERTIFICATE OF CORRECTION

Patent No. 3,457,273                          July 22, 1969

Paul Rumpf et al.

It is certified that error appears in the above identified patent and that said Letters Patent are hereby corrected as shown below:

In the heading to the printed specification, lines 4 to 6 "assignors to Centre National de la Recherche Scientifique, Arcueil, France, a French body corporate" should read -- assignors to Centre National de la Recherche Scientifique, Paris, France, a French body corporate and Laboratoires Anphar, Arcueil, France, a French body corporate --.

Signed and sealed this 7th day of July 1970.

(SEAL)
Attest:

Edward M. Fletcher, Jr.
Attesting Officer

WILLIAM E. SCHUYLER, JR.
Commissioner of Patents